US009070281B2

(12) United States Patent
Kruse et al.

(10) Patent No.: US 9,070,281 B2
(45) Date of Patent: Jun. 30, 2015

(54) METHOD FOR MONITORING INDIVIDUAL PHOTOVOLTAIC MODULES IN AN ARRANGEMENT THAT COMPRISES SEVERAL PHOTOVOLTAIC MODULES AND DEVICE FOR PERFORMING SAID METHOD

(75) Inventors: Ingmar Kruse, Nuremberg (DE); Roustam Asimov, Minsk (BY)

(73) Assignee: Ingmar Kruse (DE)

(*) Notice: Subject to any disclaimer, the term of this patent is extended or adjusted under 35 U.S.C. 154(b) by 825 days.

(21) Appl. No.: 13/379,319

(22) PCT Filed: Jun. 28, 2010

(86) PCT No.: PCT/EP2010/003837
§ 371 (c)(1),
(2), (4) Date: Apr. 19, 2012

(87) PCT Pub. No.: WO2011/000505
PCT Pub. Date: Jan. 6, 2011

(65) Prior Publication Data
US 2012/0197569 A1    Aug. 2, 2012

(30) Foreign Application Priority Data
Jul. 3, 2009   (DE) .......................... 10 2009 031 839

(51) Int. Cl.
*G01R 25/00*    (2006.01)
*G08C 25/00*    (2006.01)
(Continued)

(52) U.S. Cl.
CPC ............ *G08C 25/00* (2013.01); *G08B 13/1409* (2013.01); *H02S 50/10* (2014.12)

(58) Field of Classification Search
CPC ..................... G08B 13/1409; G08C 25/00

USPC ............................................ 702/65
See application file for complete search history.

(56) References Cited

U.S. PATENT DOCUMENTS 4,574,378 A  *  3/1986  Kobayashi .................... 370/348
8,473,250 B2 *  6/2013  Adest et al. .................... 702/182
(Continued)

FOREIGN PATENT DOCUMENTS

DE        101 36 147 A1    2/2003
DE     20 2008 012 345 U1  3/2009
(Continued)

OTHER PUBLICATIONS

International Search Report for corresponding International Patent Application No. PCT/EP2010/003837 mailed May 20, 2011.

*Primary Examiner* — Tung S Lau
*Assistant Examiner* — Xiuquin Sun
(74) *Attorney, Agent, or Firm* — Merchant & Gould P.C.

(57) ABSTRACT

Disclosed is a method for monitoring photovoltaic modules, which are used in an arrangement comprising several photovoltaic modules, which are connected in particular in series by means of electrical conducting means, wherein a separate microcontroller is associated with the respective photovoltaic module, an and in particular continual determination of at least one status parameter of the respective photovoltaic module is performed by the microcontroller, the data concerning the status parameter are transmitted to an evaluating unit, the data intended to be transmitted to the evaluating unit are designed in the form of data blocks, the electrical conducting means present for connecting the individual photovoltaic modules are used to transmit the data blocks, and the data blocks are transmitted independently of each other so that the probability of data blocks colliding with each other is greater than 0.

24 Claims, 4 Drawing Sheets

Figure 1:
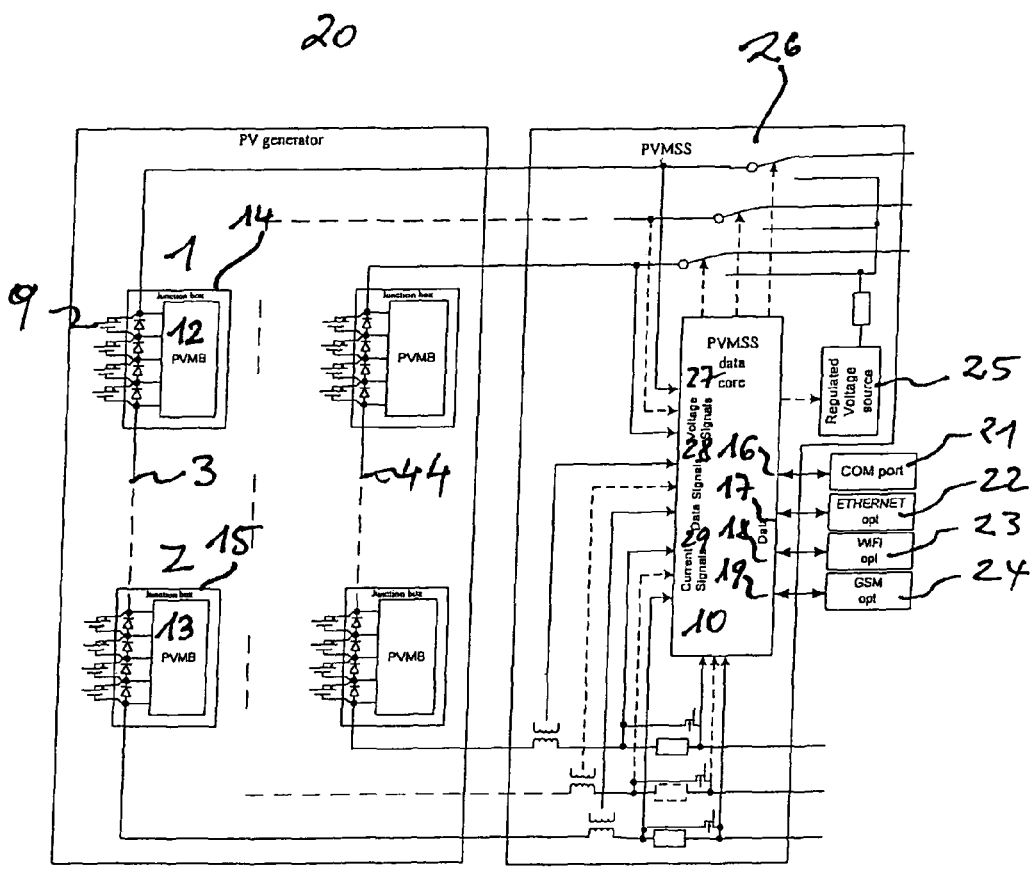

(51) Int. Cl.
*G08B 13/14* (2006.01)
*H02S 50/10* (2014.01)

(56) References Cited

U.S. PATENT DOCUMENTS

2008/0143188 A1* 6/2008 Adest et al. .................. 307/82
2009/0182532 A1* 7/2009 Stoeber et al. ............... 702/183

FOREIGN PATENT DOCUMENTS

| | | |
|---|---|---|
| DE | 10 2008 003 272 A1 | 7/2009 |
| DE | 10 2008 021 654 B3 | 12/2009 |
| EP | 0 420 295 A1 | 4/1994 |
| EP | 0 604 777 A1 | 7/1994 |
| JP | 2004-260015 A | 9/2004 |
| WO | WO 2008/125915 A2 | 10/2008 |
| WO | WO 2010/020385 A2 | 2/2010 |

* cited by examiner

METHOD FOR MONITORING INDIVIDUAL PHOTOVOLTAIC MODULES IN AN ARRANGEMENT THAT COMPRISES SEVERAL PHOTOVOLTAIC MODULES AND DEVICE FOR PERFORMING SAID METHOD

This application is a National Stage Application of PCT/EP2010/003837, filed 28 Jun. 2010, which claims benefit of Serial No. 10 2009 031 839.9, filed 3 Jul. 2009 in Germany and which applications are incorporated herein by reference. To the extent appropriate, a claim of priority is made to each of the above disclosed applications.

SUBJECT MATTER OF THE INVENTION

The present invention relates on one hand to a method for monitoring individual photovoltaic modules in an arrangement that comprises several photovoltaic modules and on the other hand to an arrangement for generating electric current.

TECHNICAL FIELD

A generic method is already known from the German patent publication DE 101 36 147 B4. The method comprises a module converter as a constituent part of each solar module, said converter having several separate sensors for measuring certain characteristics of the solar module, as, e.g., DC voltage, direct current, temperature or vibration. The measured values are provided to a microprocessor as analog signals, said microprocessor converting the analog signals into digital signals and supplying information to a power controller, which is connected to a busbar, in the form of an actual value. This known method has the disadvantage of being complicated and expensive with regard to the installation required.

SUMMARY

The aim of the present invention is provide a generic method and a corresponding arrangement, which facilitate a monitoring of the photovoltaic modules using means, which are simple in terms of circuitry, and at reduced costs.

The aim mentioned above is met with regard to the claimed method by a method according to claim 1, with regard to the claimed photovoltaic module by a photovoltaic module according to claim 23 and with regard to the claimed arrangement by an arrangement according to claim 27.

The further dependent claims relate to advantageous embodiments of the present invention.

The independent transmission of the data blocks means that the transmission of the data sets from the one photovoltaic module via the electrical conducting means does not take into consideration whether another or several other photovoltaic modules are not also transmitting the data blocks thereof at the same time. The individual photovoltaic modules are deliberately not addressed from the direction of the evaluating unit. The microcontroller does not experience any addressing from the side of the evaluating unit. It is in fact self-sufficient. For that reason, the invention allows for an efficient checking of the performance capability of individual photovoltaic modules in arrangements comprising multiple photovoltaic modules to be carried out at comparatively low investment costs. Because the arrangement does not require any additional wiring or cabling or separate power sources associated with the photovoltaic modules, the option exists to correspondingly retrofit existing systems with low investment costs. In so doing, the efficiency of photovoltaic systems can be considerably improved with simple retrofitting measures.

The disadvantages of a unidirectional data transmission method to be expected at a first glance, such as the data blocks colliding with each other during transmission or no addressing of the individual photovoltaic modules going out from a central evaluation location, have to be consciously accepted because the advantages to be achieved far outweigh said disadvantages.

Figure 2:
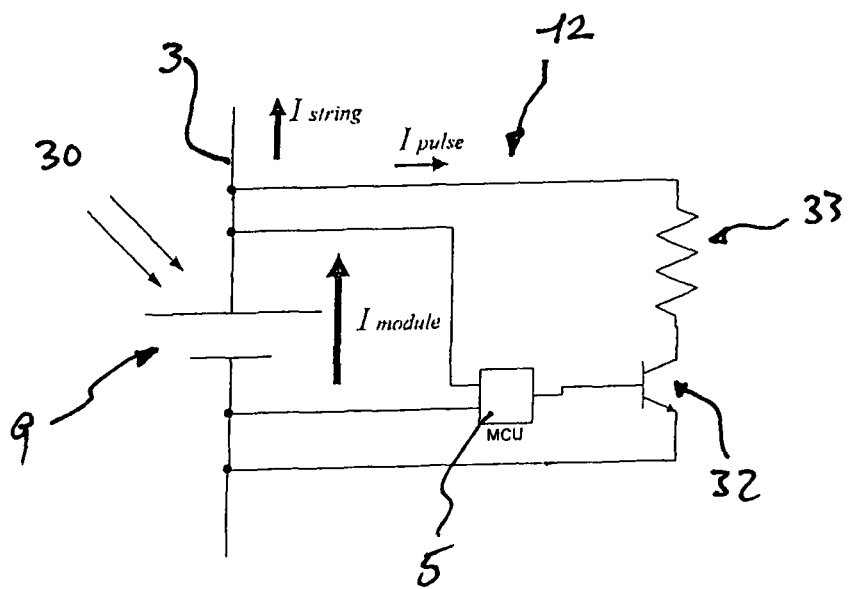
Figure 3:
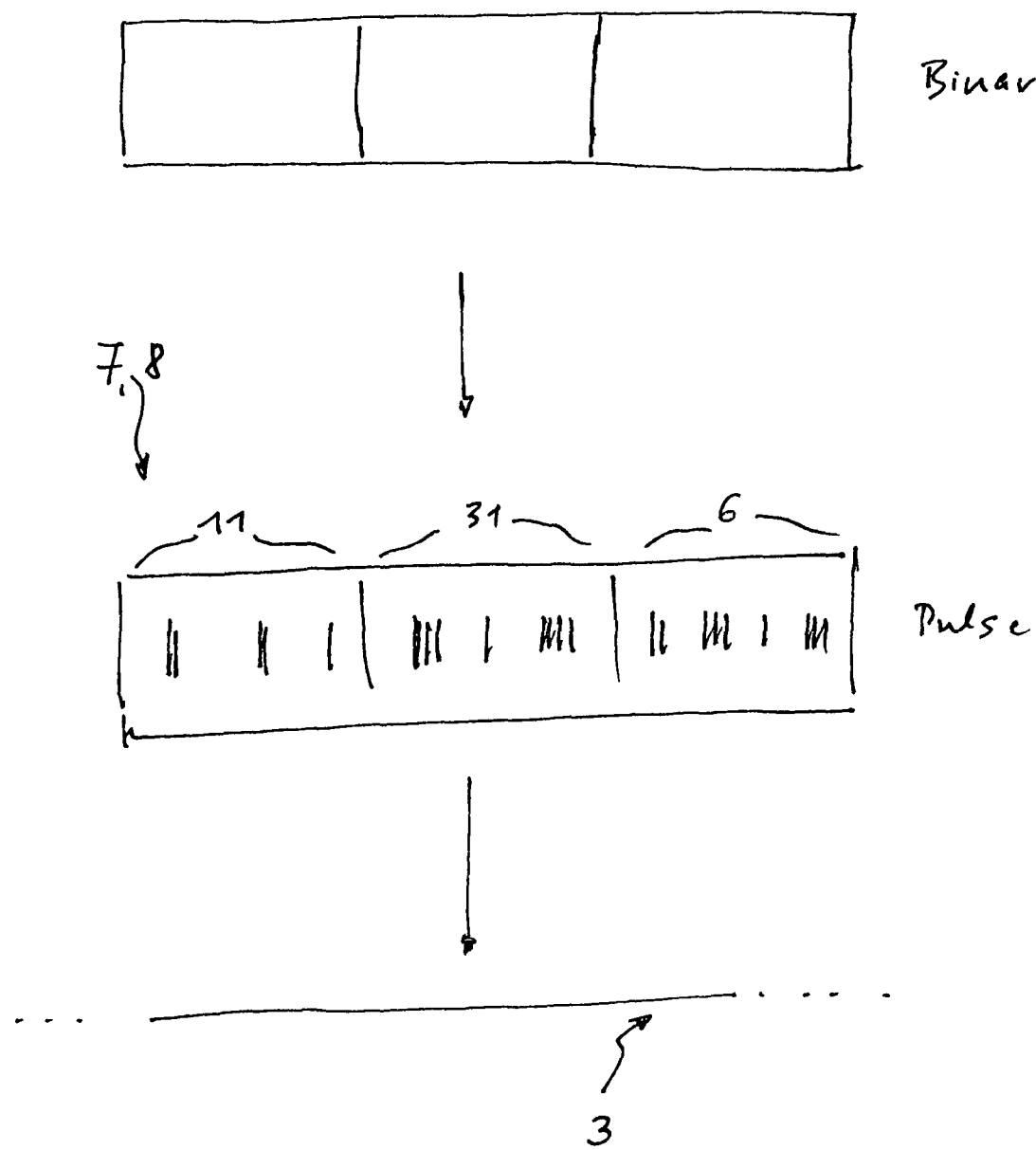
Figure 4:
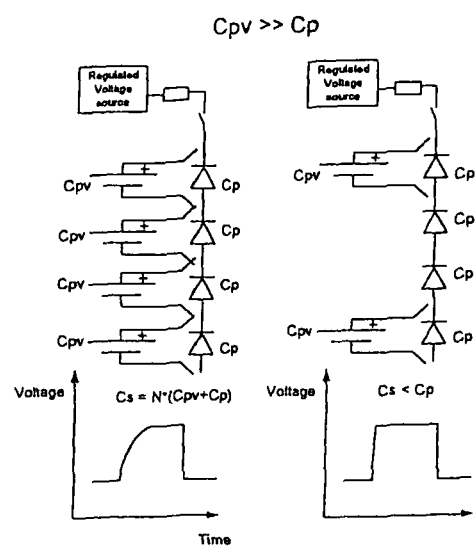

An advantageous embodiment of the present invention is explained below in detail with the aid of the drawings. The following are shown:

FIG. 1 a schematic overall view of a photovoltaic system according to an embodiment of the present invention, FIG. 2 a greatly simplified schematic circuit diagram of a photovoltaic module according to an embodiment of the present invention, FIG. 3 a greatly simplified schematic representation of data blocks to be transmitted to the evaluating unit, FIG. 4 a greatly simplified schematic circuit diagram for ensuring an anti-theft monitoring.

DETAILED DESCRIPTION

FIG. 1 shows a photovoltaic system 20 for generating electrical energy from solar energy. The photovoltaic system comprises a plurality of photovoltaic modules 1, 2, which are connected to one another via conventional electrical conducting means 3 or respectively 4 in the form of a series (series connection). The arrangement which can be seen in the view pursuant to FIG. 1 comprises overall two rows of photovoltaic modules, wherein the photovoltaic modules 1, 2 are connected to one another via the electrical conducting means 3 and the other photovoltaic modules depicted in FIG. 1 are connected to one another via the electrical conducting means 4. It is suggested in FIG. 1 that yet further series connections of photovoltaic modules are also conceivable.

The electrical conducting means 3 and 4 serve the purpose of supplying a consumer load, storage or the like with current generated by the large number of photocells 9 of the respective photovoltaic module, e.g. 1 or 2.

A testing device 12 or 13 is associated with each photovoltaic module e.g. 1 or 2. Said testing device 12, 13 is situated in the so-called junction box 14, 15, which connects the photovoltaic module to the electrical conducting means 3 or 4.

A central evaluating unit 10 is connected via the relevant electrical conducting means, e.g., 3 or 4 to the respective photovoltaic module, e.g., 1 or 2 of the photovoltaic system 20. The evaluating unit 10 is provided for the purpose of receiving and evaluating items of information concerning the status (e.g. voltage, temperature and/or amperage etc.) of the individual photovoltaic modules, e.g., 1 or 2 and if need be for introducing appropriate measures to eliminate any problems (replacement of photocells or photovoltaic modules, cutting back of vegetation casting shadows on said modules, cleaning of the surfaces of said modules, repair of storm damage to electrical lines etc.). The evaluating unit has different interfaces 16, 17, 18, 19 for connecting the same to the desired data output equipment or data communication equipment as, e.g., a COM port 21, an optical interface 22, an internet connection 23 and/or a GSM connection 24.

A power source 25 is provided for operating the evaluating unit 10. By means of a switchgear assembly 26, it is possible to switch the evaluating unit 10 to the respective row of the individual photovoltaic modules, e.g. 1 or 2.

The evaluating unit 10 has inputs (voltage input 27), (data input 28) as well as (current signal input 29). Said inputs 27 to 29 are connected to the electrical conducting means 3.

The energy for the operation of the testing device 12, 13 is provided according to the invention directly in form of electrical energy from the photovoltaic modules 1, 2. For that reason, it is not necessary for an additional power source or additional supply wiring to be in the region of the photovoltaic modules. In fact, the already existing standard wiring or cabling can be used.

Provided no sunlight is available, no output power is then provided to the testing device 12, 13. This is however acceptable because the determination of the status parameters of the respective photovoltaic modules in a time when sunlight is available is sufficient.

FIG. 2 shows the simplified circuit diagram for determining at least one status parameter of the respective photovoltaic module, e.g., of the photovoltaic module 1 depicted in FIG. 2. For the sake of simplicity, only one photocell 9 is depicted in FIG. 2, wherein in reality a plurality of photocells 9 are associated with a circuit as depicted in FIG. 2. As can be seen in FIG. 2, a current I is generated within the photocell 9 when irradiated by photons, whereupon said current is fed into the electrical line 3.

The testing device 12 or 13 furthermore comprises a microcontroller 5, which provided with a separate (not depicted) generator as well as separate control software can carry out the necessary operations. The microcontroller 5 comprises means for determining the status parameters, as, e.g., a device for acquiring the electrical voltage. The testing device 12 or 13 includes means for generating current pulses, which can be read out as data at the end of the electrical conducting means 3. For this purpose, said testing device 12 comprises a shunt circuit, which has a resistor 33 and a transistor 32, which is activated by the microcontroller 5. A power drop pulse is generated in the electrical conducting means 3 with this circuit.

In the microcontroller 5, a binary code structure is converted with the aid of a suitable model into a particular sequence of corresponding power drop pulses.

The use of the shunt facilitates the generation of a data signal by means of current modulation. Current pulses are generated as data elements by means of the microcontroller 5 in conjunction with the shunt and are fed into the electrical conducting means 3 for the transmission of the data.

In addition to the status data to be transmitted, the individual serial number of the photovoltaic module 1 or 2 as well as plausibility data is coded in this way and fed into the electrical conducting means.

The microcontroller 5 generates current pulses, which are fed into the electrical conducting means 3 from a binary bit string according to the circuit option depicted in FIG. 2. As can be seen in FIG. 3, a data block, e.g. the data block 7, comprises data elements 11, which identify the respective photovoltaic module, e.g. 1, data elements 31 relating to the respective status data of the associated photovoltaic module, as, e.g., voltage etc. as well as data elements 6, which include plausibility data. The generation as well as transmission of said data occurs in the form of pulses in frames. The pulse or bit string within such a frame or respectively data element 11 or 31 is generated in a pseudorandom manner in order to create a lower electromagnetic induction (EMI) and thereby to limit the noise. This can, for example, be achieved by a "regular" bit being replaced by a bit string, i.e. a plurality of bits, to be generated by the microcontroller, wherein said sequence can in turn be read out by the evaluating unit. The order of the bits of this bit string can, for example, be generated in a pseudorandom matter. The order of a pseudorandom number is the order of the numbers, which can be calculated by any defined arithmetic process and this can be used for reading out the bit string.

The invention relates to a unidirectional data transmission. The photovoltaic modules of a photovoltaic system 20 transmit the data blocks thereof, e.g., 7 independently of one another so that the probability of a collision of data blocks within the electrical conducting means 3 or 4, which connect the individual photovoltaic modules, e.g., 1 or 2 to one another, is greater than 0. The aforementioned independent transmission of the data blocks 7, 8 means that the transmission of the data sets from the one photovoltaic module via the electrical conducting means 3 or 4 does not take into consideration whether another or several other photovoltaic modules are not also transmitting the data blocks thereof at the same time. There is no addressing of the individual photovoltaic modules being performed from the direction of the evaluating unit 10. The microcontroller 5 does not experience any addressing from the side of the evaluating unit. Said microcontroller is in fact self-sufficient.

Each microcontroller 5 waits a delay time $T_w$ to be generated in particular randomly until a data block 7, 8 is fed into the electrical conducting means 3 (cf. FIG. 3). The mean random delay time $\Delta T_w$ fulfills the following condition $$\Delta T_w \geq N \cdot T_D / \Delta C_R$$

wherein N represents the number of photovoltaic modules in the series, $T_D$ is the time necessary for the transmission of a data block and $\Delta C_R$ represents the mean error rate due to the collision of data blocks. The mean error rate $\Delta C_R$ preferably lies in a range from $10^{-1}$ to $10^{-6}$, preferably $10^{-2}$ to $10^{-5}$. At a value of, for example, $10^{-3}$, there is one collision for 1000 data blocks.

The length of time for transmitting a data block 11 or 12 is, for example, approximately 2 ms. If an average transmission rate of the data blocks of 15 seconds at a number of 8 photovoltaic modules in a row is assumed, then merely one data block in a thousand data blocks is lost through collision.

In the event of a collision of data blocks 7, 8 in which the data blocks are altered, the option exists with the aid of the plausibility data for the evaluating unit to selectively sort out altered, i.e. defective, data blocks.

A conventional 8-bit microcontroller having a timer function (e.g. SOIC20, 8-bit/8ch ADC) is used as the microcontroller 5.

The data blocks transmitted by the electrical conducting means are read in the evaluating unit 10, and in fact on the one hand the data elements 11 relating to the identification of the concrete photovoltaic module as well as on the other hand the data elements 31 relating to the status parameters of the respective photovoltaic modules as, e.g., the measured current. The readout of these data occurs in the evaluating unit 10, e.g., via the use of a shunt resistor, which is only connected up in phases.

FIG. 4 shows the arrangement of several photovoltaic modules in a row, wherein the voltage, which is generated by a photovoltaic module series, is measured. The sum of all of the voltages read out by the individual testing devices 11, 12 should correspond to the voltage actually measured by the evaluating unit 10. This makes it possible for the energy of the device to be directly ascertained. Moreover, any anti-theft security can be implemented if the testing devices are not in operation due to insufficient sunlight. On account of this technology, the internal capacity Cpv is higher than the capacity of the protection diode Cp in the junction box 14 or 15. The capacity of N photovoltaic modules along a row is Cs=N×(Cpv+Cp). In the event that one or several photovoltaic modules are decoupled, the value Cs becomes substantially smaller than Cp and as a result an item of information for a theft or a similar situation is provided.

The evaluating unit 10 is designed to provide data in various ways as was already described at the beginning of the application.

It should be pointed out expressly that partial combinations of features of the embodiment described are claimed as involving an inventive step.

REFERENCE NUMERAL LIST 1. photovoltaic module
2. photovoltaic module
3. electrical conducting means
4. electrical conducting means
5. microcontroller
6. data element
7. data block
8. data block
9. photocell
10. evaluating unit
11. data element
12. testing device
13. testing device
14. junction box
15. junction box
16. interface
17. interface
18. interface
19. interface
20. photovoltaic system
21. COM port
22. optical interface
23. internet connection
24. GSM connection
25. power source
26. switchgear assembly
27. voltage input
28. data input
29. current signal input
30. photons
31. data element
32. diode
33. resistor

The invention claimed is:

1. Method for monitoring photovoltaic modules, which are used in an arrangement comprising several photovoltaic modules, which are connected in particular in series by means of electrical conducting means, the method comprising the steps of:
   associating a separate microcontroller with the respective photovoltaic module;
   performing continual determination of at least one status parameter of the respective photovoltaic module by the microcontroller;
   transmitting the data concerning the status parameter to an evaluating unit;
   designing the data intended to be transmitted to the evaluating unit in the form of data blocks;
   using the electrical conducting means present for connecting the individual photovoltaic modules to transmit the data blocks,
   wherein the data blocks are transmitted independently of each other so that the probability of said data blocks colliding with each other is greater than 0,
   wherein each microcontroller waits a delay time $T_w$ to be generated randomly until a data block is fed into the electrical conducting means and the mean random delay time—$\Delta T_w$ fulfills the following condition $$\Delta T_w \geq N \cdot T_D / \Delta C_R$$

wherein N depicts the number of photovoltaic modules in the series, $T_D$ is the time which is necessary to transmit a data block and $\Delta C_R$ represents the mean error rate due to data blocks colliding with each other.

2. Method according to claim 1, wherein the microcontroller of the one photovoltaic module generates data blocks independently of the microcontroller of the further photovoltaic modules and feeds said data blocks into the electrical conducting means.

3. Method according to claim 2, wherein the current located in the electrical conducting means is changed, in particular modulated, to form the data for the data blocks.

4. Method according to claim 1, wherein the mean error rate $\Delta C_R$ lies in a range from $10^{-1}$ to $10^{-6}$, preferably $10^{-2}$ to $10^{-5}$.

5. Method according to claim 4, wherein the current located in the electrical conducting means is changed, in particular modulated, to form the data for the data blocks.

6. Method according to claim 1, wherein the current located in the electrical conducting means is changed, in particular modulated, to form the data for the data blocks.

7. Method according to claim 6, wherein a sequence of modulation pulses is generated in the electrical conducting means from a bit string in the microcontroller.

8. Method according to claim 6, wherein the data block is constructed from individual data elements.

9. Method according to claim 8, wherein the data block comprises data elements for identifying the respective photovoltaic modules.

10. Method according to claim 8, wherein the data block comprises data elements concerning the status parameters of the respective photovoltaic modules.

11. Method according to claim 10, wherein the electrical voltage is determined as the status parameter.

12. Method according to claim 8, wherein the data block comprises data elements for a plausibility check.

13. Method according to claim 1, wherein
   the energy for transmitting the data blocks is drawn from the photovoltaic module itself.

14. Method according to claim 1, wherein the character string or bit string within the data block is generated according to the pseudorandom principle.

15. Method according to claim 1, wherein the respective data blocks are transmitted at specified, in particular constant intervals.

16. Method according to claim 1, wherein the check for the presence of data blocks, which have experienced a damaging impact, in particular a collision, is performed by a plausibility check on the part of an evaluating unit with the help of the data element.

17. Method according to claim 1, wherein the serial number of each photovoltaic module is used for the purpose of initializing the formation of the character string within the data block.

18. Method according to claim 1, wherein a DC current measurement is performed in a common evaluating unit.

19. Method according to claim 1, wherein a capacitance measurement is performed in the common evaluating unit.

20. Method according to claim 1, wherein a voltage measurement is performed.

21. Method according to claim 1, wherein a capacitance measurement is performed.

22. Method according to claim 1, wherein the voltage, the temperature and/or the amperage are ascertained as the status parameter.

23. Photovoltaic module, in particular for performing the method according to claim 1, comprising
- at least one, preferably a plurality of photovoltaic cells connected to each other,
- a junction box for connecting the photovoltaic cells to an electrical conducting means,
- a testing device which determines status parameters of the relevant photovoltaic module and feeds said parameters in the form of data blocks into the electrical conducting means independently of the feed of data blocks from testing devices of other photovoltaic module,
- the testing device comprising a microcontroller, which performs the transmission of data blocks by means of modulation of the current which is available in the electrical conducting means and said
- microcontroller comprising a device for measuring voltage, temperature and/or amperage, wherein
- the testing device comprises a shunt circuit for current modulation.

24. Arrangement for generating electrical current from solar energy comprising
- a plurality of photovoltaic modules,
- connecting means which are provided for the purpose of connecting the individual photovoltaic modules in a series,
- wherein a testing device for acquiring status parameters of the associated photovoltaic module is associated with each photovoltaic module,
- an evaluating unit, which is provided for the purpose of receiving and further processing the signals of the testing device, said signals of each testing device being generated as data blocks and
- said signals of the respective testing device being fed into the electrical conducting means independently of the feed of data blocks of other testing devices,
- so that the probability of data blocks of different photovoltaic modules colliding with each other is greater than 0 and each microcontroller waits a delay time $T_w$ to be generated randomly until a data block is fed into the electrical conducting means and
- the mean random delay time $\Delta T_w$ fulfills the following condition $$\Delta T_w \geq N \cdot T_D / \Delta C_R$$

wherein N depicts the number of photovoltaic modules in the series, $T_D$ is the time which is necessary to transmit a data block and $\Delta C_R$ represents the mean error rate due to data blocks colliding with each other.

* * * * *